US012519651B1

(12) United States Patent
Farrell et al.

(10) Patent No.: US 12,519,651 B1
(45) Date of Patent: *Jan. 6, 2026

(54) AUTHENTICATED IN-BAND COMMUNICATION

(71) Applicant: Amazon Technologies, Inc., Reno, NV (US)

(72) Inventors: Daniel John Farrell, Seattle, WA (US); Troy Lawson Bevis, Seattle, WA (US); Nathan Pritchard, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 456 days.

This patent is subject to a terminal disclaimer.

(21) Appl. No.: 16/781,291

(22) Filed: Feb. 4, 2020

(51) Int. Cl.
*H04L 9/32* (2006.01)
*G06F 13/20* (2006.01)
*H04L 9/08* (2006.01)
*H04L 9/40* (2022.01)
*G06F 9/455* (2018.01)

(52) U.S. Cl.
CPC ............ *H04L 9/3242* (2013.01); *G06F 13/20* (2013.01); *H04L 9/0894* (2013.01); *G06F 9/45541* (2013.01); *H04L 63/1458* (2013.01)

(58) Field of Classification Search
CPC . H04L 9/3242; H04L 9/0894; H04L 63/1458; G06F 13/20; G06F 9/45541
USPC ......................................................... 713/181
See application file for complete search history.

(56) References Cited

U.S. PATENT DOCUMENTS

| 5,613,113 | A | 3/1997 | Goldring |
| 5,887,131 | A | 3/1999 | Angelo |
| 7,711,758 | B1 | 5/2010 | Gillespie |
| 8,079,081 | B1 | 12/2011 | Lavrik |
| 8,156,553 | B1 | 4/2012 | Church |
| 8,230,228 | B2 * | 7/2012 | Hahn ...................... G06F 21/64 713/193 |
| 8,452,968 | B2 * | 5/2013 | Flores .................. H04L 63/123 713/180 |
| 9,178,701 | B2 * | 11/2015 | Roth ....................... H04L 9/083 |
| 9,282,106 | B2 * | 3/2016 | Fahrny ................. H04L 63/105 |
| 10,783,250 | B2 * | 9/2020 | Hershman ............. G06F 21/554 |

(Continued)

FOREIGN PATENT DOCUMENTS

CN 103186434 A 7/2013
EP 2897051 7/2015
(Continued)

OTHER PUBLICATIONS

IPMI Specification V2.0 Rev. 1.1, 2013.
(Continued)

*Primary Examiner* — Dereena T Cattungal
(74) *Attorney, Agent, or Firm* — Hogan Lovells US LLP

(57) ABSTRACT

Communications, such as system event log messages, can be authenticated using a secondary message, as may be sent over a common channel. Each secondary message can be a copy of a corresponding primary message signed with a hash, where that hash can be generated using a secret, such as a secret key. In some embodiments, the secret can be stored in BIOS where the messages are generated, such that an operating system executing on a computing device cannot access the secret in order to send valid secondary messages that match content of the corresponding first messages.

20 Claims, 6 Drawing Sheets

(56) References Cited

U.S. PATENT DOCUMENTS

| | | | |
|---|---|---|---|
| 11,368,307 B1 | 6/2022 | Ozarkar et al. | |
| 12,192,375 B2* | 1/2025 | Vacek | H04L 9/0869 |
| 2003/0172265 A1 | 9/2003 | Vu et al. | |
| 2003/0196110 A1* | 10/2003 | Lampson | H04L 63/0435 |
| | | | 713/176 |
| 2003/0236992 A1* | 12/2003 | Yami | H04L 43/00 |
| | | | 726/23 |
| 2005/0086370 A1 | 4/2005 | Howard | |
| 2005/0210331 A1 | 9/2005 | Connelly et al. | |
| 2005/0246612 A1 | 11/2005 | Leis et al. | |
| 2007/0300207 A1 | 12/2007 | Booth | |
| 2008/0028235 A1* | 1/2008 | Smith | G06F 21/575 |
| | | | 713/190 |
| 2008/0130893 A1* | 6/2008 | Ibrahim | G06F 21/572 |
| | | | 380/277 |
| 2008/0181406 A1 | 7/2008 | Iyer et al. | |
| 2008/0301200 A1 | 12/2008 | Doty et al. | |
| 2009/0228701 A1* | 9/2009 | Lin | H04L 9/3242 |
| | | | 713/181 |
| 2009/0271637 A1* | 10/2009 | Takekawa | H04L 9/3247 |
| | | | 713/189 |
| 2010/0082984 A1* | 4/2010 | Ellison | H04L 9/3236 |
| | | | 713/170 |
| 2010/0088522 A1* | 4/2010 | Barrus | G06F 21/64 |
| | | | 713/181 |
| 2010/0217985 A1* | 8/2010 | Fahrny | H04L 9/321 |
| | | | 713/169 |
| 2011/0131188 A1* | 6/2011 | Graziani | G06F 21/552 |
| | | | 707/687 |
| 2011/0154023 A1 | 6/2011 | Smith et al. | |
| 2011/0265183 A1* | 10/2011 | Wu | G06F 21/74 |
| | | | 718/1 |
| 2012/0096274 A1* | 4/2012 | Campagna | H04L 9/3242 |
| | | | 713/176 |
| 2012/0151223 A1* | 6/2012 | Conde Marques | |
| | | | G06F 21/6218 |
| | | | 713/193 |
| 2012/0278655 A1 | 11/2012 | Lin | |
| 2013/0086663 A1* | 4/2013 | Roth | H04L 9/0861 |
| | | | 726/7 |
| 2014/0280837 A1* | 9/2014 | Ayanam | H04L 43/0817 |
| | | | 709/223 |
| 2015/0188715 A1 | 7/2015 | Castellucci et al. | |
| 2016/0188897 A1* | 6/2016 | Zatko | G06F 21/74 |
| | | | 726/28 |
| 2016/0330027 A1* | 11/2016 | Ebrahimi | H04L 9/3066 |
| 2016/0335201 A1 | 11/2016 | Lea | |
| 2017/0013003 A1 | 1/2017 | Samuni et al. | |
| 2017/0131991 A1* | 5/2017 | Su | G06F 8/66 |
| 2017/0140152 A1 | 5/2017 | Samsonov et al. | |
| 2017/0366342 A1 | 12/2017 | Gehrmann | |
| 2017/0373839 A1* | 12/2017 | Suresh | G06F 21/44 |
| 2018/0060051 A1* | 3/2018 | Ramalingam | G06F 8/61 |
| 2018/0157700 A1* | 6/2018 | Roberts | G06F 16/2365 |
| 2018/0227130 A1* | 8/2018 | Ebrahimi | G06Q 20/065 |
| 2018/0307867 A1* | 10/2018 | Dover | G06F 21/78 |
| 2018/0357425 A1 | 12/2018 | Swaminathan | |
| 2018/0365422 A1* | 12/2018 | Callaghan | G06F 21/575 |
| 2019/0116038 A1* | 4/2019 | Sprague | G06Q 20/3674 |
| 2019/0363888 A1 | 11/2019 | Brostrom | |
| 2020/0044865 A1 | 2/2020 | Ward et al. | |
| 2020/0065273 A1* | 2/2020 | Bouda | G06F 13/20 |
| 2020/0084042 A1* | 3/2020 | Nelson | H04L 9/30 |
| 2020/0099513 A1* | 3/2020 | Angelo | H04L 63/12 |
| 2020/0099536 A1* | 3/2020 | Block | H04L 9/3236 |
| 2020/0167472 A1* | 5/2020 | Hertenstein | H04L 9/0891 |
| 2020/0314115 A1* | 10/2020 | Nabeesa | H04L 63/1408 |
| 2020/0382311 A1* | 12/2020 | Bueno | H04L 9/3239 |
| 2020/0382315 A1 | 12/2020 | Lakk | |
| 2021/0034748 A1* | 2/2021 | Ahmed | G06F 21/572 |
| 2021/0089416 A1 | 3/2021 | Katayama et al. | |
| 2021/0099281 A1* | 4/2021 | Sloane | H04L 9/0643 |
| 2021/0406378 A1* | 12/2021 | Jeansonne | G06F 21/556 |
| 2022/0294636 A1* | 9/2022 | Lutz | H04L 63/126 |

FOREIGN PATENT DOCUMENTS

| | | |
|---|---|---|
| WO | WO-0073880 | 12/2000 |
| WO | 2019088975 | 5/2019 |

OTHER PUBLICATIONS

Non-Final Office Action issued in U.S. Appl. No. 16/799,208, dated Dec. 17, 2021.

Final Office Action issued in U.S. Appl. No. 16/799,208, dated Jun. 10, 2022.

Fengwei Zhang: IOCheck: A Framework to Enhance the Security of I/O Devices at Runtime; 2013 43rd Annual IEEE/IP Conference (Year: 2013).

Non-Final Office Action issued in U.S. Appl. No. 16/794,554, dated Feb. 7, 2022.

Final Office Action issued in U.S. Appl. No. 16/794,554, dated Aug. 15, 2022.

Non-Final Office Action issued in U.S. Appl. No. 16/794,554, dated Feb. 2, 2023.

Kelsey, J., Callas, J., and A. Clemm, "Signed Syslog Messages", RFC 5848, DOI 10.17487/RFC5848, May 2010, <https://www.rfc-editor.org/info/rfc5848>.

Non-Final Office Action issued in U.S. Appl. No. 16/799,208, dated Feb. 17, 2023.

Final Office Action issued in U.S. Appl. No. 16/799,208, dated Sep. 8, 2023.

Final Office Action issued in U.S. Appl. No. 16/794,554, dated Aug. 17, 2023.

Non-Final Office Action issued in U.S. Appl. No. 16/794,554, dated May 23, 2024.

Non-Final Office Action issued in U.S. Appl. No. 16/799,208, dated Jun. 12, 2024.

Non-Final Office Action issued in U.S. Appl. No. 16/799,208, dated Dec. 31, 2024.

Final Office Action issued in U.S. Appl. No. 16/794,554, dated Dec. 5, 2024.

Final Office Action issued in U.S. Appl. No. 16/799,208, dated Jun. 18, 2025.

Corrected Notice of Allowance issued in U.S. Appl. No. 16/794,554, dated May 9, 2025.

Notice of Allowance issued in U.S. Appl. No. 16/794,554, dated Apr. 30, 2025.

Wang et al., "A dual BIOS safe startup method based on national devices", 2023 4th International Conference on Computer Engineering and Application (ICCEA), 2023, pp. 77-82.

Lin et al., "Using TPM to improve boot security at BIOS layer", 2012 IEEE International Conference on Consumer Electronics (ICCE), 2012, pp. 376-377.

Arbaugh et al., "A seecure and reliable bootstrap architecture", Proceedings 1997 IEEE Symposium on Security and Privacy, Cat. No. 97CB36097, 1997, pp. 65-71.

* cited by examiner

AUTHENTICATED IN-BAND COMMUNICATION

BACKGROUND

In a multi-tenant resource environment, or "cloud environment," resources such as servers may be provisioned for use by various users. In order to manage these resources, informational messages such as system event logs can be used to indicate when there is an occurrence detected with respect to one or more of these resources. Occurrences of interest can be of various types, such as for memory corruption or incorrect configuration. These system event logs can be used to diagnose and act on such occurrences. In some cases, however, a user may have a host operating system (OS) executing on that server, enabling that host instance to send unauthentic system event logs (SELs), including those which can trigger a power-down and manual maintenance of the server. In effect, an attacker could trigger an attack such as a denial of service (DOS) attack on user instances and resource infrastructure. Further, this unnecessary manual maintenance by data center staff will be costly and time consuming for a provider of those resources.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for the authentication of messages or other such communications. In particular, various embodiments provide secondary messages that can be used to validate primary messages sent over a specific communication channel. A given secondary message can include an encrypted or signed copy of a corresponding primary message. A recipient of respective primary and secondary messages having access to a secret, such as a secret key, used to encrypt or sign the secondary message can then verify that the content of the secondary message matches the first message. In some embodiments, the secondary message can be signed with a hash, where that hash can be generated using a secret key stored in BIOS where the messages are generated. An operating system executing on this computing device then cannot access the secret in order to send valid secondary messages that match content of the corresponding first messages. In some embodiments, each primary message can be caused to be different, and may include use of an incremental counter or other such metric, such that the secondary message will also be different and valid messages cannot be resent by an operating system or other such source.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
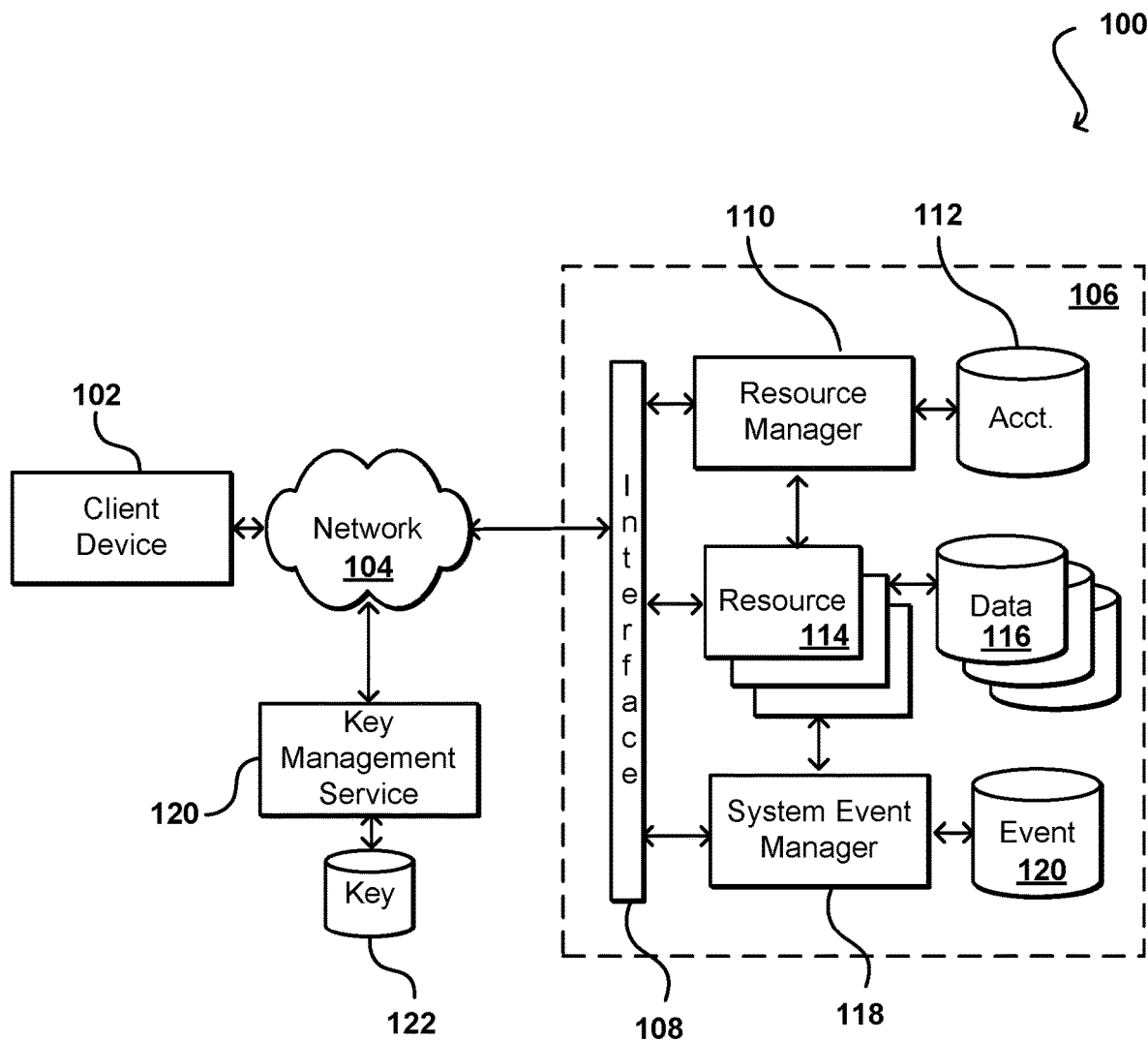
FIG. 1 illustrates components of an example resource environment that can be utilized in accordance with various embodiments.

FIG. 1 illustrates an example environment 100 in which aspect of various embodiments can be implemented. Such an environment can be used in some embodiments to provide resource capacity for one or more users, or customers of a resource provider, as part of a shared or multi-tenant resource environment. In this example a user is able to utilize a client device 102 to submit requests across at least one network 104 to a multi-tenant resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 106 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

In this example, the resource provider environment 106 includes a system event manager 118 that is able to receive messages from various resources 114, 116 relating to events or occurrences that are detected on, or by, those resources. These can include, for example, system event logs generated on those resources and transmitted to the system event manager 118. In this example, data for those system event logs can be stored to an event log 120 for subsequent analysis. As mentioned, system event logs can be useful for resources such as managed servers, such as those offered through Amazon Web Services, Inc. (AWS). System event logs can correspond to notifications, from a lowest level of a resource stack on a resource, that something of interest has happened on, or with respect to, that resource. As mentioned, this may correspond to a memory corruption error that has occurred on a managed server, a processing error that has occurred, or an incorrect configuration that has been identified, among other such options.

In situations where a user might have a host OS executing on that resource, such as for a bare-metal server instance, however, the host (user) instance can send messages such as system event logs. It is possible that there are unauthentic system event logs, including logs which can trigger a power-down and manual maintenance of the server. These could be fake log messages or a resending of earlier valid log messages, among other such options. Sending of such messages could be performed by an attacker who has targeted the user or user instance. Such messages could also be triggered by a malicious actor who could subscribe to many bare-metal instances and send system event logs indicating hardware failure. In effect, an attacker could cause a denial of service (DOS) attack on user instances and resource infrastructure.

Approaches in accordance with various embodiments can provide for authentication of system event log entries or message to thwart such an attack. In at least some embodiments, this can involve using cryptographically secure authentication of system event log entries. For example, this can include generating and sending a second message each time a system event log is sent or triggered by a resource. This secondary message can be a hash of the system event log message generated using a secret key, for example, which can be sent in a same communications band as the generated system event log message. In at least some embodiments the hash can involve a hash-based message authentication code (HMAC)-based signature of the system event log, or "add system event log" message. The HMAC can be generated using an algorithm that does not add detrimental delay to system event logs sent from a server BIOS or other such source. Such an approach can involve at least some amount of post-processing away from that server in order to authenticate the system event logs, such as by a system event manager 118 that is able to pull log data from a respective event log 120. Such an approach can also be implemented without requiring a change in protocol for sending existing system event log messages.

In this example, a secret key is used to generate the HMAC-based signature. This key can be any appropriate cryptographic key or secret that can be used to generate a hash, and may include a randomly generated character string in some embodiments. The key or secret can be managed by a key management service 120 in at least some embodiments, which can be located within, or external to, the resource provider environment 106. The key management service can also be provided by the provider or a third party in various embodiments. The key management can send the key to a resource, such as a server, upon specific events, such as during boot or restart of a server. The key can be sent to the respective server, and the key can also be stored to a local key repository 122. If a system event manager 118 is tasked with validating the system event logs, then the system event manager 118 can obtain the key from the key management service. In at least some embodiments, keys are stored in volatile memory on servers such that they will be lost upon a reboot or power down event, and must be retrieved again at power up or during the reboot process. In at least some embodiments, a new key may be sent at such an event to improve security.

Figure 2:
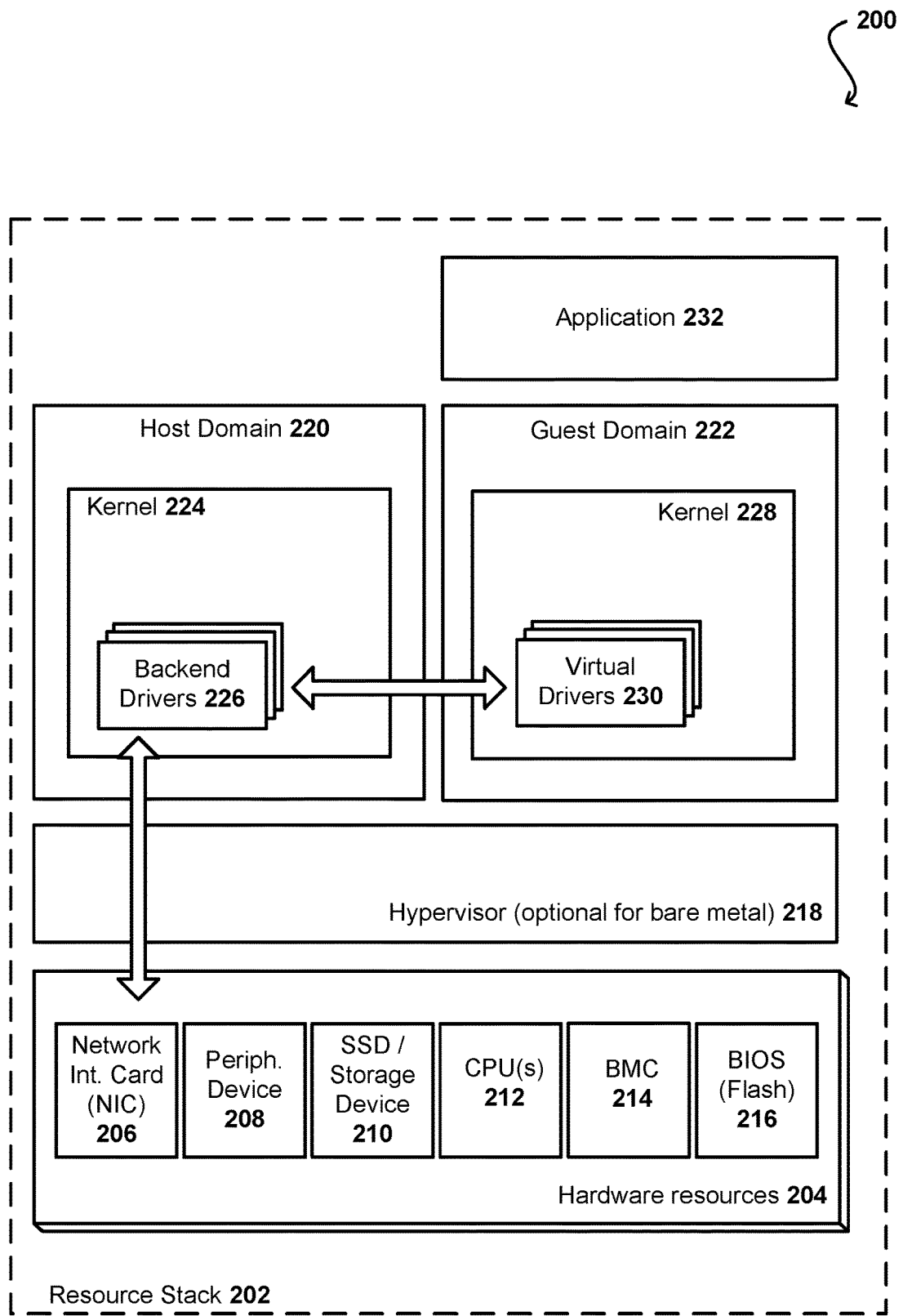
FIG. 2 illustrates an example resource stack for a computing device that can be utilized in accordance with various embodiments.

FIG. 2 illustrates an example resource stack 202 of a physical resource 200 that can be utilized in accordance with various embodiments. Such a resource stack 202 can be used to provide a virtualized environment for a user (or customer of a resource provider) having an operating system provisioned on the resource. In accordance with the illustrated embodiment, the resource stack 202 includes a number of hardware resources 204, such as one or more central processing units (CPUs) 212; solid state drives (SSDs) or other storage devices 210; a network interface card (NIC) 206, one or more peripheral devices (e.g., a graphics processing unit (GPU), etc.) 208, a BIOS implemented in flash memory 216, and a baseboard management controller (BMC) 214, and the like. In some embodiments, the hardware resources 204 reside on a single computing device (e.g. chassis). In other embodiments, the hardware resources can reside on multiple devices, racks, chassis, and the like. Running on top of the hardware resources 204, a virtual resource stack can include further includes a virtualization layer such as a hypervisor 218 for a Xen-based implementation, a host domain 220, and potentially also one or more guest domains 222 capable of executing at least one application 232. The hypervisor 218 manages the execution of the one or more guest operating systems and allows multiple instances of different operating systems to share the underlying hardware resources 204. Conventionally, hypervisors are installed on server hardware, with the function of running guest operating systems, where the guest operating systems themselves act as servers.

In accordance with an embodiment, a hypervisor 218 can host a number of domains (e.g., virtual machines), such as the host domain 220 and one or more guest domains 222. In one embodiment, the host domain 220 (e.g., the Dom-0) is the first domain created and helps virtualize hardware resources and manage all of the other domains running on the hypervisor 218. For example, the host domain 220 can manage the creating, destroying, migrating, saving, or restoring the one or more guest domains 222 (e.g., the Dom-U). In accordance with various embodiments, the hypervisor 218 can control access to the hardware resources such as the CPU, input/output (I/O) memory, and hypervisor memory.

A guest domain 222 can include one or more virtualized or para-virtualized drivers 230 and the host domain can include one or more backend device drivers 226. When the operating system (OS) kernel 228 in the guest domain 222 wants to invoke an I/O operation, the virtualized driver 230 may perform the operation by way of communicating with the backend device driver 226 in the host domain 220. When the guest driver 230 wants to initiate an I/O operation (e.g., to send out a network packet), a guest kernel component can identify which physical memory buffer contains the packet (or other data) and the guest driver 230 can either copy the memory buffer to a temporary storage location in the kernel for performing I/O or obtain a set of pointers to the memory pages that contain the packet(s). In at least one embodiment, these locations or pointers are provided to the backend driver 226 of the host kernel 224 which can obtain access to the data and communicate it directly to the hardware device, such as the NIC 206 for sending the packet over the network.

It should be noted that the resource stack 202 illustrated in FIG. 2 is only one possible example of a set of resources that is capable of providing a virtualized computing environment and that the various embodiments described herein are not necessarily limited to this particular resource stack. In some embodiments, the guest domain 222 may have substantially native or "bare metal" access to the NIC 206 hardware, for example as provided by device assignment technology based on an IO Memory Management Unit (IO-MMU) device mapping solution like Intel VT-D. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 214 can maintain a list of events that have occurred in the system, referred to herein as a system event log (SEL). In at least one embodiment, the BMC 214 can receive system event logs from the BIOS 216 on the host processor. The BIOS 216 can provide data for system events over an appropriate interface, such as an I2C interface, to the BMC using an appropriate protocol, such as an SMBus System Interface (SSIF). As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 218 can prevent the guest operating system, or guest domain 222, from sending such system event log data to the BMC 214. In the case of bare metal access without such a hypervisor, however, user instances can have the ability to send data for system event that spoof events from the BIOS 216. Such activity could lead to compromised bare metal instances being prematurely degraded due to fake system event data produced by the user OS.

In at least one embodiment, however, there will be portions of the physical resource 200 that will be inaccessible to the user OS. This can include, for example, BIOS memory 216. BIOS memory 216 in at least one embodiment is volatile memory such that any data stored to that memory will be lost in the event of a reboot or power down event. As mentioned, data such as a secret key can be stored to BIOS memory 216 at boot time, before a user OS is executing on the resource. Once the user OS is executing on the resource, that OS will be prevented from accessing that secret key in BIOS memory 216. In at least one embodiment, the secret key will be stored in a location that is known to the BIOS but otherwise unmapped such that the OS will not be able to discover that location. In at least one embodiment, this secret key (or other stored secret) can be provided to the BMC 214 when adding system event log events, whereby the BMC 214 can confirm that the event is being sent by the BIOS 216 and not by the user OS.

In at least one embodiment, a secret stored to BIOS memory 216 can be used to generate a keyed hash, where each system event log message can be associated with a second system event log message signed by a secure hash and sent by the BIOS. In at least one embodiment this can be performed for each "add system event log" request over a SMBus System Interface (SSIF) from BIOS, where the BIOS will send a secondary "add system event log" request that is an HMAC-based signature of the "add system event log request" in the same communications band. In at least one embodiment, the BMC can then confirm, using this second message, that the BIOS is the source of the event data and not the user OS. Additional advantages to such an approach include that no change to legacy BMCs is required, and the protocol to add a system event message can remain intact.

In at least some embodiments, a BMC 214 may send the authenticated system event log data to a target recipient, such as a system event manager. This sending may occur periodically, in response to a request from the event manager, or in response to a type of event that was detected. In at least some embodiments, a system event manager can store this data in an event log for subsequent analysis. The analysis can include identifying problems to be rectified, or potential problems to be investigated. Action can then be taken, such as to replace a component, change a configuration, or upgrade a system resource. In at least some embodiments, the event manager may also analyze data logged for invalid system event log messages. If it is determined that there have been a number of such messages from a single source, for a single user, or over a determined period of time, then the messages may be determined to be suspicious and remedial action may be taken, such as to power down those servers or deactivate a user account.

As mentioned, the key can be stored in volatile memory on the server, so a power drain will wipe the key from memory. The key can stay inside this system RAM while the system is powered on. There will be memory protection in place in various embodiments so that a host operating system cannot gain access to this BIOS memory, the memory protection thus acting as a type of memory barrier. A key is provided or checked at boot time, before a user host operating system is up and running. In at least some embodiments, this hash could be spoofed if a malicious actor somehow obtained the original system event log message, as well as the hash message. That actor could then cause those messages to be sent repeatedly. Given that there is a secret key in BIOS protected memory, however, the host OS cannot generate a relevant hash for a new system event log that the host generates itself. As mentioned, generation of a hash is a mathematical computation that will generate a different value for each hash sent with a system event log message, which will be based in part upon the secret key.

In some embodiments, a system event log may contain information that changes for each message. For example, each message might include an incremented sequence number. In this way, the hash value for the second message would change with each sending of the system event log message, which would prevent a malicious actor from sending the same pair of messages repeatedly, because each occurrence would be different if valid. In at least some embodiments, the first and second system event log messages would be of the same size, such as 128 bits in length. Such an approach also provides additional protection against a malicious actor being able to brute force and generate a valid hash. This second message can also be of any appropriate size in some embodiments, such as a larger message (e.g., an HMAC-256 which is 256 bits), which would give it stronger protection. In some embodiments the second message could use an HMAC that is then truncated to a certain size.

Figure 3:
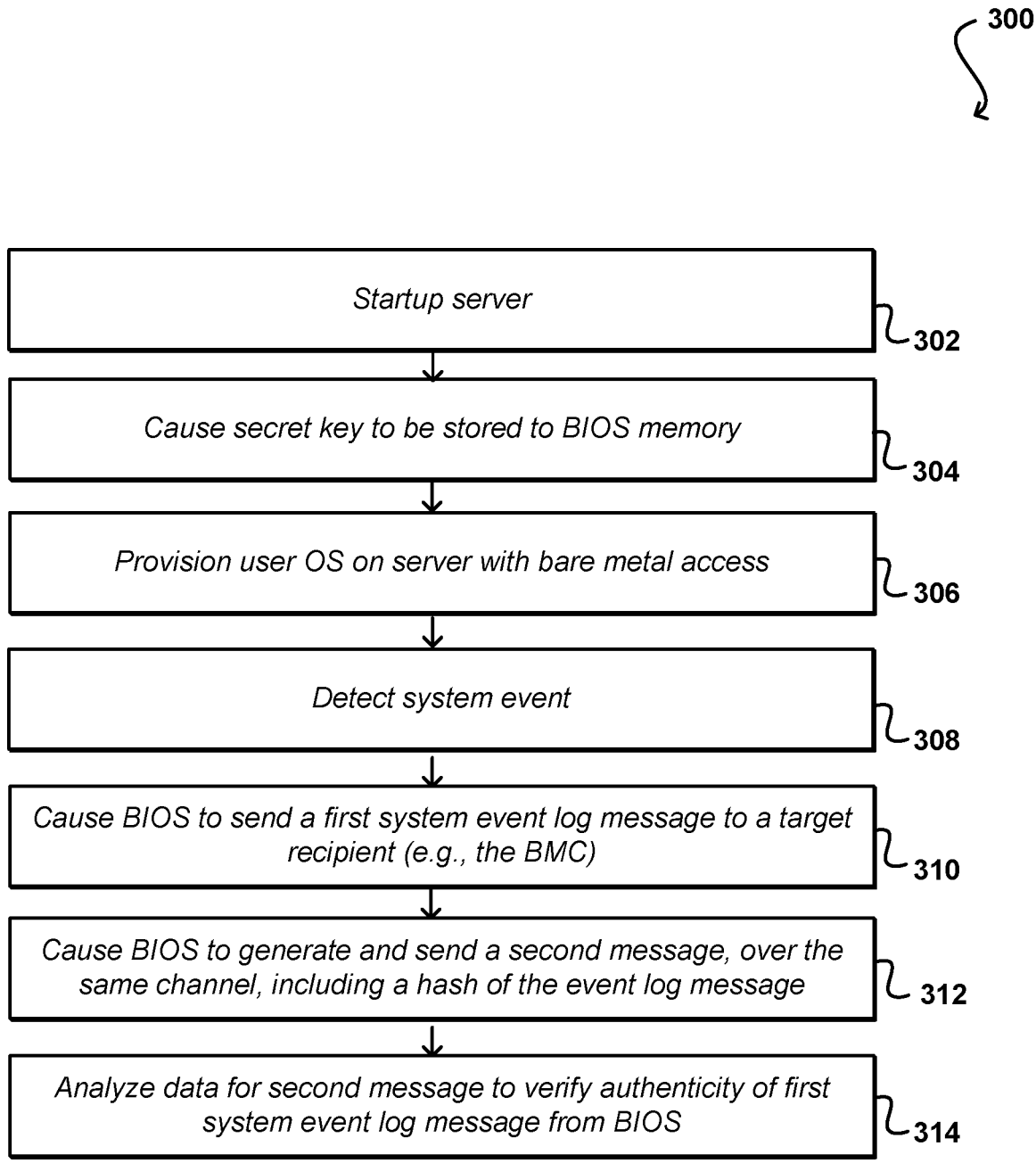
FIG. 3 illustrates an example process for sending an authenticatable system event log message that can be generated in accordance with various embodiments.

FIG. 3 illustrates an example process 300 for sending authenticatable system event log data that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, although system event log messages are used as an example, it should be understood that various other types of communications can benefit from aspects of the various embodiments as well, as would be apparent to one of ordinary skill in the art in light of the teachings and suggestions contained herein. In this example, a server undergoes a startup 302 procedure during which time system BIOS is active but a user operating system is not yet executing with hardware access on the server. Similar states can occur during a reboot or other such action as well. While in this state, a secret key (or other secret or credential) can be caused 304 to be stored to BIOS memory. This can be a key received from an external source or a secret generated within the BIOS, among other such options. After startup is completed in this example, a user OS can be provisioned 306 and executed on the server, in this case with bare metal access.

During operation of the server, a system event can be detected 308. This can be from any appropriate component or service on the server, and may come from a monitoring function in a hardware device as well, among other such options. In response to the event, the BIOS can be caused 310 to send a first system log event message to a target recipient or address, such as the BMC in this example. The BIOS can also be caused 312 to generate and send a second message, over the same channel, that includes a hash of the event log message, such as an HMAC-signed system event log message. Data received by the recipient, such as the BMC, can then be analyzed 314 to verify authenticity of the first system event log message from the BIOS where the data of the second message, decrypted using the secret key, matches the data of the first event message.

Figure 4:
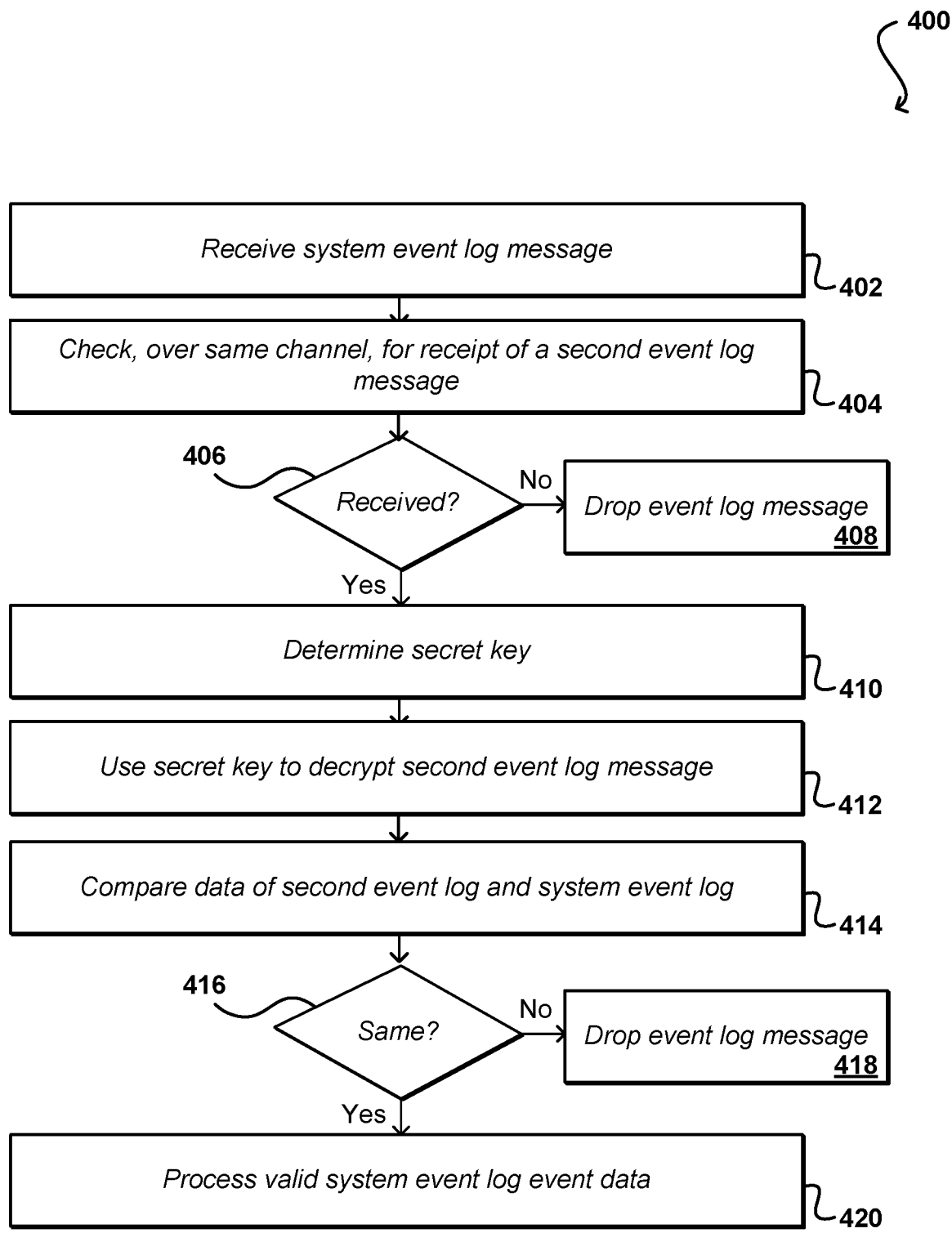
FIG. 4 illustrates an example process for verifying a source of a system event log message that can be generated in accordance with various embodiments.

As mentioned, however, a user or OS with bare metal access can send fake system event log messages, or multiple instances of a valid event log message. Accordingly, FIG. 4 illustrates an example process 400 that can be used to authenticate a system event log message in accordance with various embodiments. As mentioned, other types of messages, communications, or data can be authenticated using such an approach as well. In this example, a system event log message is received 402 over a communication channel. A recipient of this message, such as the BMC on a server, can check 402 that communication channel to determine whether a second, related system event log message was received. In some embodiments the recipient might first analyze the first message to determine whether a second message should be expected to authenticate that type of message. If it is determined 406 that a second message was not received, but should have been, then the first message is unable to be authenticated and the event log message can be dropped 408 or discarded. In some embodiments each dropping of a message may be logged for analysis, such as may be used to identify a potential attack as discussed herein. In some embodiments, the recipient may request a valid second message from the BIOS before dropping the first message for lack of a second message.

If, however, a second, related system event log message is received, then the recipient can determine 410 a relevant secret key (or other secret or credential) for a corresponding sender of the first event message. Once determined, or obtained where necessary, this secret key can be used 412 to decrypt the second system event log message. The decrypted data from the second message can then be compared 414 to the data of the first system event log message. If it is determined 416 that the data is not the same, then the first event log message can be dropped as discussed above. If the data from the two messages is identical then the valid system event log message data can be processed 420 as having been authenticated to come from a valid source. Processing of the data may involve analyzing the data to determine a type of system event, logging the event data, or forwarding to system event manager for analysis, among other such options.

Figure 5:
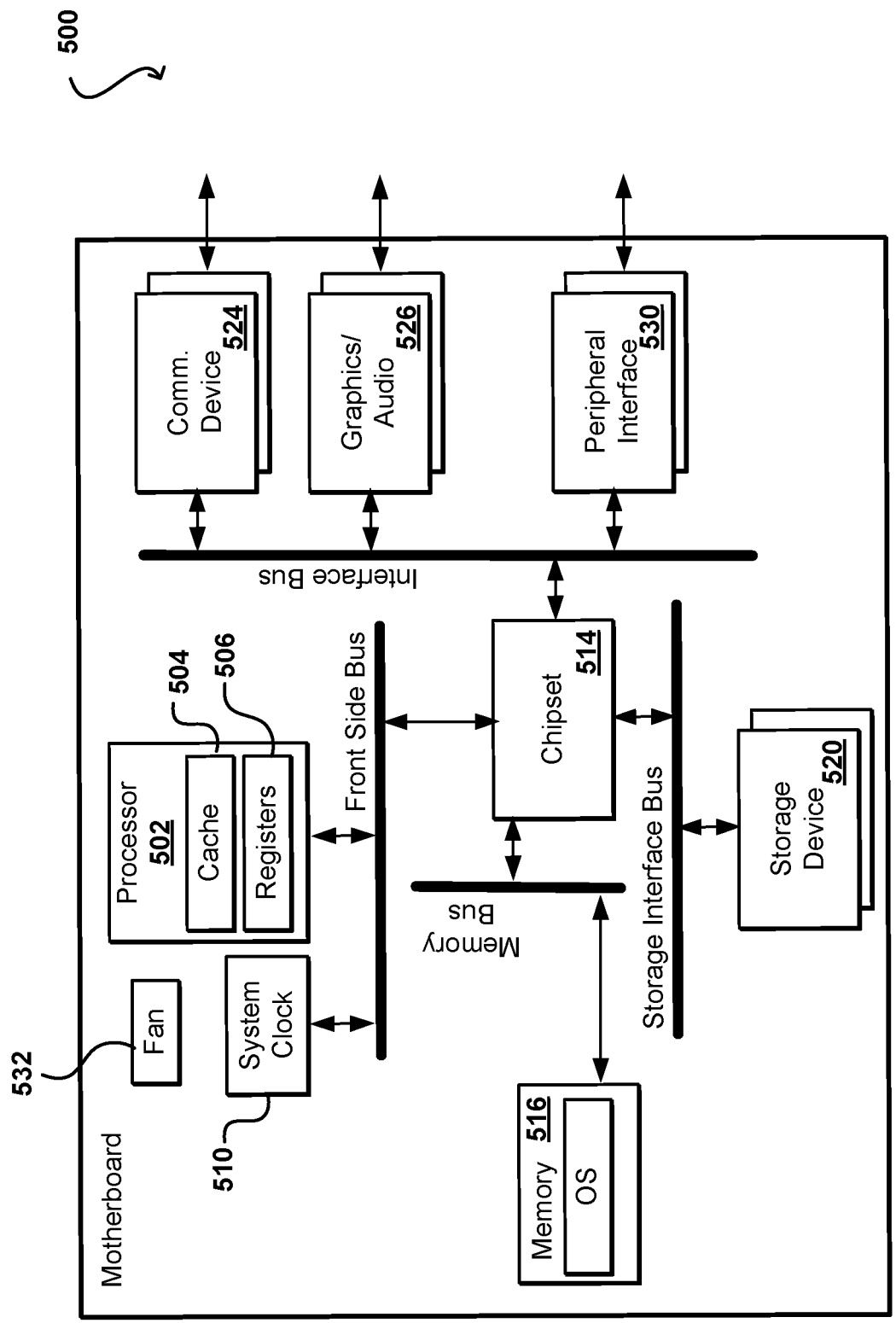
FIG. 5 illustrates components of an example computing device that can be utilized in accordance with various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 5 illustrates components of an example computing device 500 that can be utilized in accordance with various embodiments. As known for computing devices, the computer will have one or more processors 502, such as central processing units (CPUs), graphics processing units (GPUs), and the like, that are electronically and/or communicatively coupled with various components using various buses, traces, and other such mechanisms. A processor 502 can include memory registers 506 and cache memory 504 for holding instructions, data, and the like. In this example, a chipset 514, which can include a northbridge and southbridge in some embodiments, can work with the various system buses to connect the processor 502 to components such as system memory 516, in the form or physical RAM or ROM, which can include the code for the operating system as well as various other instructions and data utilized for operation of the computing device. The computing device can also contain, or communicate with, one or more storage devices 520, such as hard drives, flash drives, optical storage, and the like, for persisting data and instructions similar, or in addition to, those stored in the processor and memory. The processor 502 can also communicate with various other components via the chipset 514 and an interface bus (or graphics bus, etc.), where those components can include communications devices 524 such as cellular modems or network cards, media components 526, such as graphics cards and audio components, and peripheral interfaces 530 for connecting peripheral devices, such as printers, keyboards, and the like. At least one cooling fan 532 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 502 can obtain data from physical memory 516, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 504 in at least some embodiments. The computing device 500 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 530, a communication device 524, a graphics or audio card 526, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 502 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)) In such cases, the CPU may interface with one or more I/O devices. In some cases, these I/O) devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device In some embodiments, the I/O adapter device is internally integrated into the host device. Also in communication with the I/O) adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc, in which the components of the bare metal host device communicate Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 6:
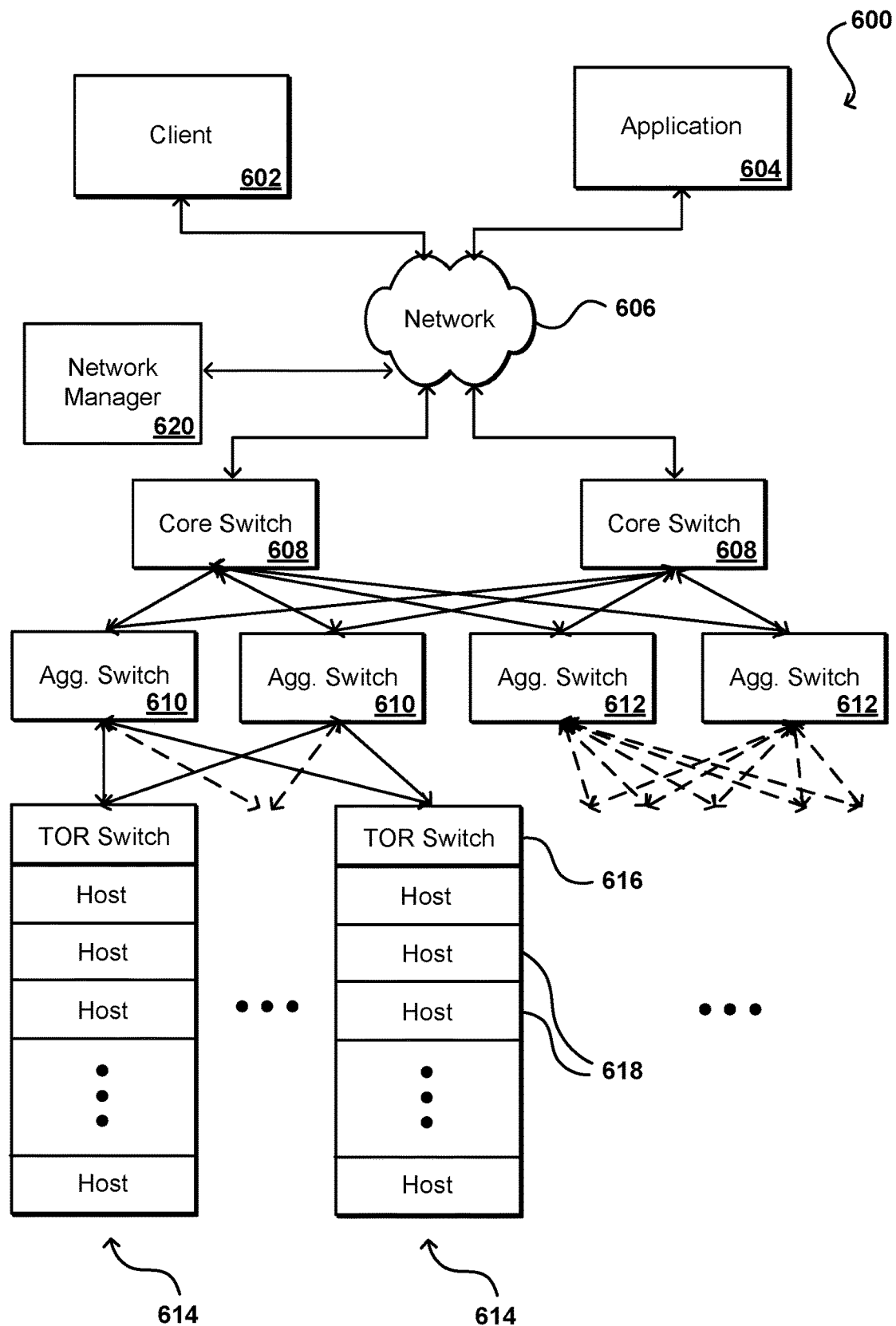
FIG. 6 illustrates components of an example environment in which aspects of the various embodiments can be implemented.

As mentioned, in many instances the live updating of BIOS for a server can occur in a shared resource environment, such as a data center or server farm. FIG. 6 illustrates an example network configuration 600 that can be used to route communications between specific host machines or other such devices in such an environment. This example shows a typical design that can be used for a data center, wherein a source such as a client device 602 or application 604 is able to send requests across at least one network 606, such as the Internet or a cellular network, to be received by one or more components of the data center. Properties of various components of the network, such as provisioned instances, etc., can be managed using at least one management system, component, or service 620. In this example, the requests are received over the network to one of a plurality of core switches 608, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 608 is able to communicate with each of a plurality of aggregation switches 610, 612, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 610, 612 is linked to a plurality of physical racks 614, each of which typically contains a top of rack (TOR) or "access" switch 616 and a plurality of physical host machines 618, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 606. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting, on a computing device having an operating system associated with a separate entity, a system event;
   generating, by Basic Input Output System (BIOS) on the computing device, a first system event log (SEL) message corresponding to the system event;
   generating a hash of the first SEL message using a secret key, the secret key being stored in the BIOS and inaccessible to the operating system executing on the computing device;
   generating, by the BIOS, a second SEL message comprising the hash of the first SEL message, wherein the second SEL message being generated each time after the first SEL message is generated;
   sending the first SEL message over a specified communication channel to a recipient;
   sending the second SEL message, comprising the hash, to the recipient over the same specified communication channel; and
   enabling the recipient to authenticate the first SEL message by decrypting, using the secret key, the hash comprised in the second SEL message to verify that the second SEL message comprises the first SEL message.

2. The computer-implemented method of claim 1, further comprising:
   causing the secret key to be stored to the BIOS during a boot action of the computing device, before the operating system is executing on the computing device.

3. The computer-implemented method of claim 1, further comprising:
   causing different instances of the first SEL message to have a different bit, wherein the corresponding second SEL messages will also be different and wherein redundant SEL messages will be unable to be authenticated.

4. The computer-implemented method of claim 1, further comprising:
   performing an action in response to data for the system event contained in the authenticated first SEL message, the action including determining a cause of the system event, performing a remedial action, logging the data, or forwarding the data to an external system event manager.

5. The computer-implemented method of claim 1, wherein the recipient is a baseboard management controller (BMC) on the computing device, and wherein the first and second SEL messages are sent using an SMBus System Interface (SSIF).

6. A computer-implemented method, comprising:
   sending a first communication over a communication channel of a computing device, the computing device having an operating system;
   generating a hash of the first communication using a secret, the secret being stored in a location on the computing device that is inaccessible to the operating system;
   generating, each time after the first communication is sent, a second communication including authentication information generated using the secret and having the hash of the first communication; and
   sending the second communication over the same communication channel used to send the first communication, wherein a component having access to the secret is able to authenticate the sent first communication by decrypting the hash of the first communication within the authentication information included in the sent second communication, and using the secret to determine that the sent second communication includes the authentication information having the hash of the first communication.

7. The computer-implemented method of claim 6, wherein the first and second communications are generated by Basic Input Output System (BIOS) on the computing device.

8. The computer-implemented method of claim 7, further comprising:
causing the secret to be stored to BIOS memory during a boot action of the computing device before the operating system is executing on the computing device.

9. The computer-implemented method of claim 6, wherein the operating system is running on a bare metal configuration of the computing device.

10. The computer-implemented method of claim 6, further comprising:
detecting a system event, the first communication being a system event log (SEL) message for the system event.

11. The computer-implemented method of claim 6, further comprising:
generating the authentication information using the secret, the authentication information including a hash-based message authentication code (HMAC) signature.

12. The computer-implemented method of claim 6, further comprising:
causing different instances of the first communication to have a different bit, wherein the corresponding second communications will also be different and wherein redundant messages will be unable to be authenticated.

13. The computer-implemented method of claim 6, further comprising:
performing an action in response to data for a system event contained in an authenticated first communication, the action including determining a cause of the system event, performing a remedial action, logging the data, or forwarding the data to an external system event manager.

14. The computer-implemented method of claim 6, wherein the component is a baseboard management controller (BMC) on the computing device, and wherein the first and second communications are sent using an SMBus System Interface (SSIF).

15. The computer-implemented method of claim 6, further comprising:
causing the second communication to have a same size as the first communication.

16. A system, comprising:
a processor;
memory including instructions that, when executed by the processor, cause the system to:
send a first communication over a communication channel of a computing device, the computing device having an operating system;
generating a hash of the first communication using a secret, the secret being stored in a location on the computing device that is inaccessible to the operating system;
generate, each time after the first communication is sent, a second communication including authentication information generated using the secret and having the hash of the first communication; and
send the second communication over the same communication channel used to send the first communication, wherein a component having access to the secret is able to authenticate the sent first communication by decrypting the hash of the first communication within the authentication information included in the sent second communication, and using the secret to determine that the sent second communication includes the authentication information having the hash of the first communication.

17. The system of claim 16, wherein the first and second communications are generated by Basic Input Output System (BIOS) on the computing device, and wherein the instructions when executed further cause the system to:
cause the secret to be stored to BIOS memory during a boot action of the computing device before the operating system is executing on the computing device.

18. The system of claim 17, wherein the operating system is running on a bare metal configuration of the computing device.

19. The system of claim 16, wherein the instructions when executed further cause the system to:
detect a system event, the first communication being a system event log (SEL) message for the system event.

20. The system of claim 16, wherein the instructions when executed further cause the system to:
generate the authentication information using the secret, the authentication information including a hash-based message authentication code (HMAC) signature.

* * * * *